United States Patent
Kawasaki et al.

(10) Patent No.: US 7,027,031 B2+
(45) Date of Patent: Apr. 11, 2006

(54) TOUCH SENSE INTERFACE AND METHOD FOR CONTROLLING TOUCH SENSE INTERFACE

(75) Inventors: Haruhisa Kawasaki, Gifu (JP); Tetsuya Mouri, Nagoya (JP); Satoshi Ito, Gifu (JP)

(73) Assignee: GIFU University, Gifu (JP)

( * ) Notice: Subject to any disclaimer, the term of this patent is extended or adjusted under 35 U.S.C. 154(b) by 257 days.

(21) Appl. No.: 10/200,917

(22) Filed: Jul. 23, 2002

(65) Prior Publication Data

US 2003/0146898 A1    Aug. 7, 2003

(30) Foreign Application Priority Data

Feb. 7, 2002    (JP)    ............... 2002-030831

(51) Int. Cl.
*G09G 5/00*    (2006.01)
(52) U.S. Cl. ............... 345/156; 345/184; 700/245; 700/258; 700/264; 901/2
(58) Field of Classification Search ............... 345/156, 345/184; 700/264, 245–263; 901/2
See application file for complete search history.

(56) References Cited

U.S. PATENT DOCUMENTS

| | | | | |
|---|---|---|---|---|
| 4,685,929 A | * | 8/1987 | Monestier | 623/64 |
| 5,512,919 A | * | 4/1996 | Araki | 345/156 |
| 5,625,576 A | * | 4/1997 | Massie et al. | 703/6 |
| 5,828,813 A | * | 10/1998 | Ohm | 700/260 |
| 5,845,540 A | * | 12/1998 | Rosheim | 74/490.05 |
| 6,002,184 A | * | 12/1999 | Delson et al. | 310/14 |
| 6,477,448 B1 | * | 11/2002 | Maruyama | 700/302 |
| 6,526,669 B1 | * | 3/2003 | Nagata | 33/503 |

OTHER PUBLICATIONS

Tsuneo Yoshikawa and Akihiro Nagura, "A Touch and Force Display System for 3D Haptic Interface," Japan Virtual Reality Academy Thesis Magazine, vol. 3, No. 3, pp. 75-82, 1998 (English translation).*

(Continued)

*Primary Examiner*—Amr A. Awad
*Assistant Examiner*—Vincent E. Kovalick
(74) *Attorney, Agent, or Firm*—Boyle Fredrickson Newholm Stein & Gratz S.C.

(57) ABSTRACT

A touch sense interface provided with an arm mechanism including an arm joint, a touch sense finger base arranged in the arm mechanism, and touch sense fingers arranged on the base. The touch sense fingers each include a fingertip engaging portion, which engages an operator's finger, and a finger joint. A first detection unit detects the position and posture of the operator's hand to generate a position and posture detection signal. A control unit, which is connected to the first detection unit, controls the arm joint in accordance with the position and posture detection signal and arranges the base opposed to the hand of the operator. A second detection unit, which is electrically connected to the control unit, detects the movement of each fingertip and generates a movement detection signal. The control unit controls the active finger joint in accordance with the movement detection signal.

21 Claims, 6 Drawing Sheets

OTHER PUBLICATIONS

Naoki Suzuki, Asaki Hattori, and five others, "Development of Virtual Surgery System With Sense of Touch," Japan Virtual Reality Academy Thesis Magazine, vol. 3, No. 4, pp. 237-243, 1998 (English translation).*

Tsuneo Yoshikawa and Akihiro Nagura, "*A Touch and Force Display System for 3D Haptic Interface*" (Japan Virtual Reality Academy Thesis Magazine, vol. 3, No. 3, pp. 75-82, 1998), (abstract only).

H. Kawasaki and T. Hayashi, "*Force Feedback Glove for Manipulation of Virtual Objects, Journal of Robotics and Mechatronics,*" vol. 5, No. 1, pp. 79-84, 1993.

Naoki Suzuki, Asaki Hattori, and five others, *Development of Virtual Surgery System With Sense of Touch* Japan Virtual Reality Academy Thesis Magazine, vol. 3, No. 4, pp. 237-243, (abstract only).

* cited by examiner

TOUCH SENSE INTERFACE AND METHOD FOR CONTROLLING TOUCH SENSE INTERFACE

BACKGROUND OF THE INVENTION

The present invention relates to a touch sense interface and to a method for controlling a touch sense interface. More particularly, the present invention relates to a multiple finger touch sense interface for transmitting resistance perceptions and weight perceptions to fingertips.

A touch sense interface has been proposed in the prior art that transmits a resistance perception and a weight perception to the hand or to a single point, such as a fingertip, when contacting an object in virtual space. Examples of such touch sense interfaces include the serial-link PHANTOMTM™ of SensAble Technology, Inc. (USA, homepage http://www.Sensable.com/) and the parallel-link Haptic Master of Nissho Electronics Corporation. Although these interfaces may transmit touch senses to one location, it is difficult to transmit touch senses to multiple fingertips (multiple points).

Research has been conducted to transmit touch senses to two fingertips with two serial-link touch sense interfaces, as described in Tsuneo Yoshikawa and Akihiro Nagura, "*A Touch and Force Display System for* 3D *Haptic Interface*" (Japan Virtual Reality Academy Thesis Magazine, Vol. 3, No. 3, pp. 75–82, 1998). However, the movable range of the proposed interfaces is extremely limited.

The usage of the above interfaces decreases the awkwardness and burden of operation. However, touch sense interfaces that have a wide operating space and transmit force perceptions at multiple points have not been proposed.

To transmit the forces of multiple points, a touch sense interface has been proposed that incorporates a force feedback mechanism, which is attached to the hand or arm of a person. The following are two examples of such interface.

1. Force Feedback Glove (H. Kawasaki and T. Hayashi, "*Force Feedback Glove for Manipulation of Virtual Objects, Journal of Robotics and Mechatronics,*" Vol. 5, No. 1, pp. 79–84, 1993)

2. CyberGrasp ™ of Immersion Corporation (USA, homepage http://www.immersion.com/)

These interfaces transmit force to multiple fingertips of a person. However, since the interfaces are not connected to mechanical arms, it is difficult to transmit the perception of weight of a virtual object. Further, since the touch sense interface is attached to the hand or arm of a person, the person may feel constrained and the interface may feel heavy.

To transmit the weight perception of a virtual object, the following two systems have been proposed, which attach an arm mechanism, in addition to a force feedback mechanism, to the hand.

1. 3D Interaction products of Immersion Corporation (USA)

2. Force Feedback Device (Naoki Suzuki, Asaki Hattori, and five others, *Development of Virtual Surgery System With Sense of Touch*, Japan Virtual Reality Academy Thesis Magazine, Vol. 3, No. 4, pp. 237–243, 1998)

However, these systems also require a person to wear an arm mechanism and a fingertip force feedback mechanism. Thus, the person may feel constrained and operations may be awkward and burdensome.

SUMMARY OF THE INVENTION

It is an object of the present invention to provide a touch sense interface that transmits the weight perception of a virtual object without causing an operator to feel constrained or feel that the interface is heavy.

To achieve the above object, the present invention provides a touch sense interface provided with an arm mechanism including an active arm joint, a touch sense finger base arranged in the arm mechanism, and a plurality of touch sense fingers arranged on the touch sense finger base. The touch sense fingers each include an active finger joint and a fingertip engaging portion, which engages a fingertip of a corresponding finger of an operator. A first detection unit detects the position and posture of a hand of the operator to generate a position and posture detection signal. A control unit is electrically connected to the first detection unit. The control unit controls the active arm joint in accordance with the position and posture detection signal and arranges the touch sense finger base so that it is opposed to the hand of the operator. A second detection unit is electrically connected to the control unit to detect the movement of each fingertip and generate a movement detection signal. The control unit controls the active finger joint in accordance with the movement detection signal.

A further perspective of the present invention is a touch sense interface provided with an arm mechanism including a plurality of active arm joints and an arm connected between the active arm joints. A touch sense finger base is connected to one of the active arm joints. A plurality of touch sense fingers are arranged on the touch sense finger base. The touch sense fingers each have a plurality of active finger joints, including a first active finger joint, that are connected to the touch sense finger base. A plurality of links are connected between the active finger joints. A fingertip engaging portion is arranged on a distal end of one of the links to engage a fingertip of a corresponding finger of an operator. A first detection unit detects the position and posture of a hand of the operator to generate a position and posture detection signal. A control unit is electrically connected to the first detection unit. The control unit controls the active arm joint in accordance with the position and posture detection signal and arranges the touch sense finger base to be opposed to the hand of the operator. A second detection unit is electrically connected to the control unit to detect the movement of each fingertip and generate a movement detection signal. The control unit controls the active finger joints of each touch sense finger in accordance with the movement detection signal.

A further perspective of the present invention is a method for controlling a touch sense interface including an arm mechanism having an active arm joint, a touch sense finger base arranged in the arm mechanism, and a plurality of touch sense fingers arranged on the touch sense finger base. The touch sense fingers each have an active finger joint and a fingertip engaging portion, which engages a fingertip of a corresponding finger of an operator. The method includes detecting a position and posture of a hand of the operator, and controlling the active arm joint so that the touch sense finger base is arranged symmetric to or substantially symmetric to the hand of the operator about a hypothetical plane, which is formed by the fingertips of the operator in accordance with the position and posture detection signal.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
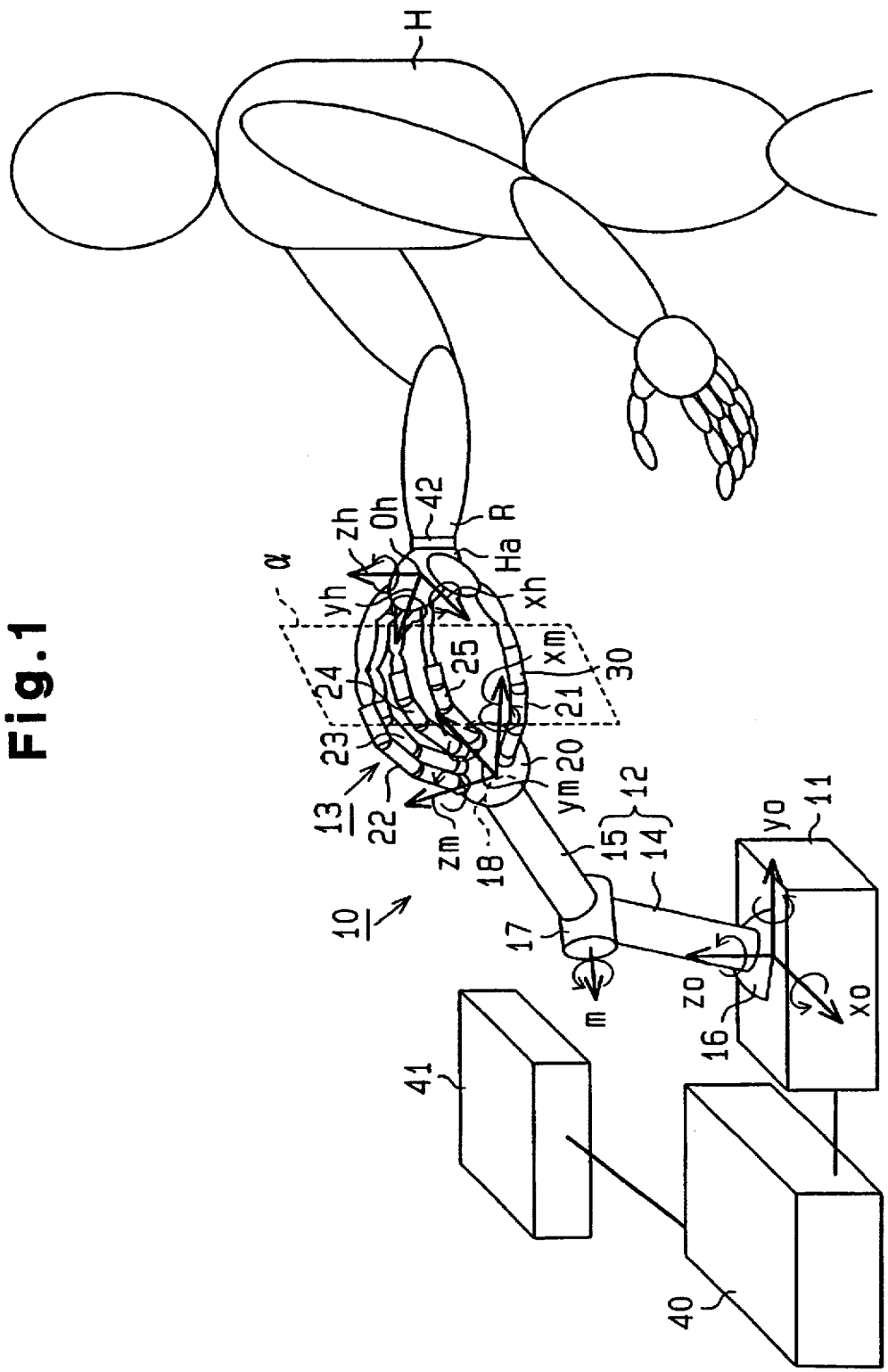
FIG. 1 is a schematic view showing a multiple finger touch sense interface according to a first embodiment of the present invention.

In the drawings, like numerals are used for like elements throughout.

A multiple finger touch sense interface 10 according to a first embodiment of the present invention will now be discussed with reference to FIGS. 1 and 2.

The multiple finger touch sense interface 10 has a base 11, an arm portion 12, and a hand 13. The arm portion 12 includes a first arm 14 and a second arm 15. The first arm 14 is connected to the base 11 by a first arm joint 16. Referring to FIG. 1, the first arm joint 16 enables rotation of the first arm 14 about three axes xo, yo, and zo, which are orthogonal to one another. The axes xo, yo, and zo correspond to the axes of a referential coordinate system.

The second arm 15 is connected to the first arm 14 by a second arm joint (elbow) 17. The second arm joint 17 permits the second arm 15 to rotate about axis m, which is the axis of the second arm joint 17.

Figure 3:
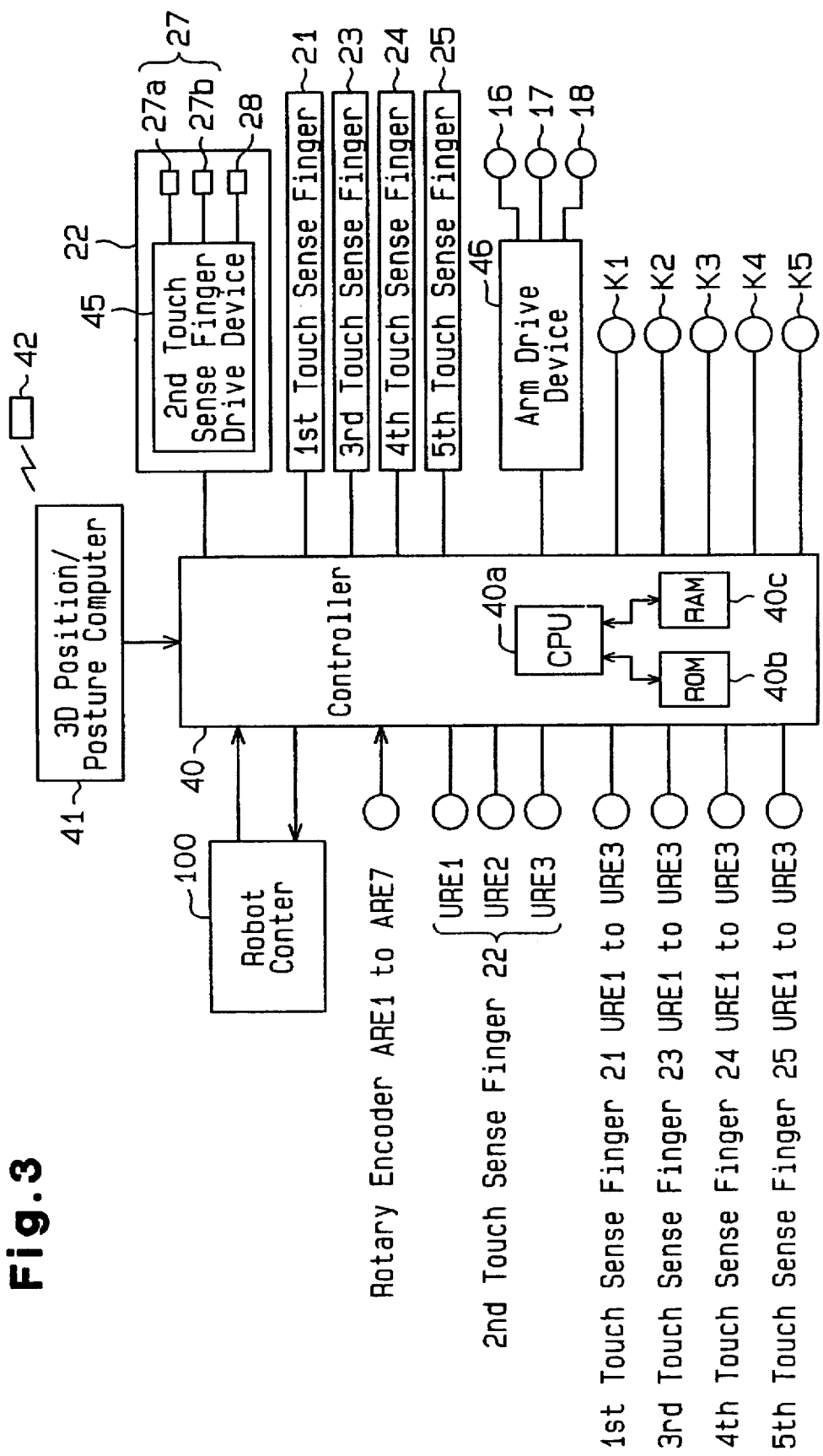
FIG. 3 is a schematic block diagram of the multiple finger touch sense interface of FIG. 1.

The hand 13 includes a touch sense finger base 20 and five touch sense fingers 21–25. The five touch sense fingers 21–25 are arranged in correspondence with the five fingers of a person. More specifically, the first touch sense finger 21 is arranged in correspondence with a human thumb, the second touch sense finger 22 is arranged in correspondence with the index finger, the third touch sense finger 23 is arranged in correspondence with the middle finger, the fourth touch sense finger 24 is arranged in correspondence with the ring finger, and the fifth touch sense finger 25 is arranged in correspondence with the little finger. The basal portion of the touch sense finger base 20 is connected to the distal portion of the second arm 15 by a wrist joint 18 (FIG. 3). Referring to FIG. 1, the wrist joint 18 permits the touch sense finger base 20 to rotate about axes xm, ym, and zm, which are orthogonal to one another. The axes xm, ym, and zm are the axes of a touch sense finger base coordinate system.

The first arm joint 16, the second arm joint 17, and the wrist joint 18 each have drive motors, the number of which corresponds to the number of the associated axes. Each drive motor is controlled to produce rotation about the associated axis.

The rotational angle of motor shafts of the drive motors of the first arm joint 16, the second arm joint 17, and the wrist joint 18 are detected by rotary encoders ARE1–ARE7, respectively (FIG. 3). To facilitate illustration, the rotary encoders ARE1–ARE7 are illustrated together in FIG. 3.

The first arm joint 16, the second arm joint 17, and the wrist joint 18 each function as an active arm joint. The arm portion 12, the first arm joint 16, the second arm joint 17, and the wrist joint 18 define an arm mechanism, which has seven degrees of freedom.

Figure 2:
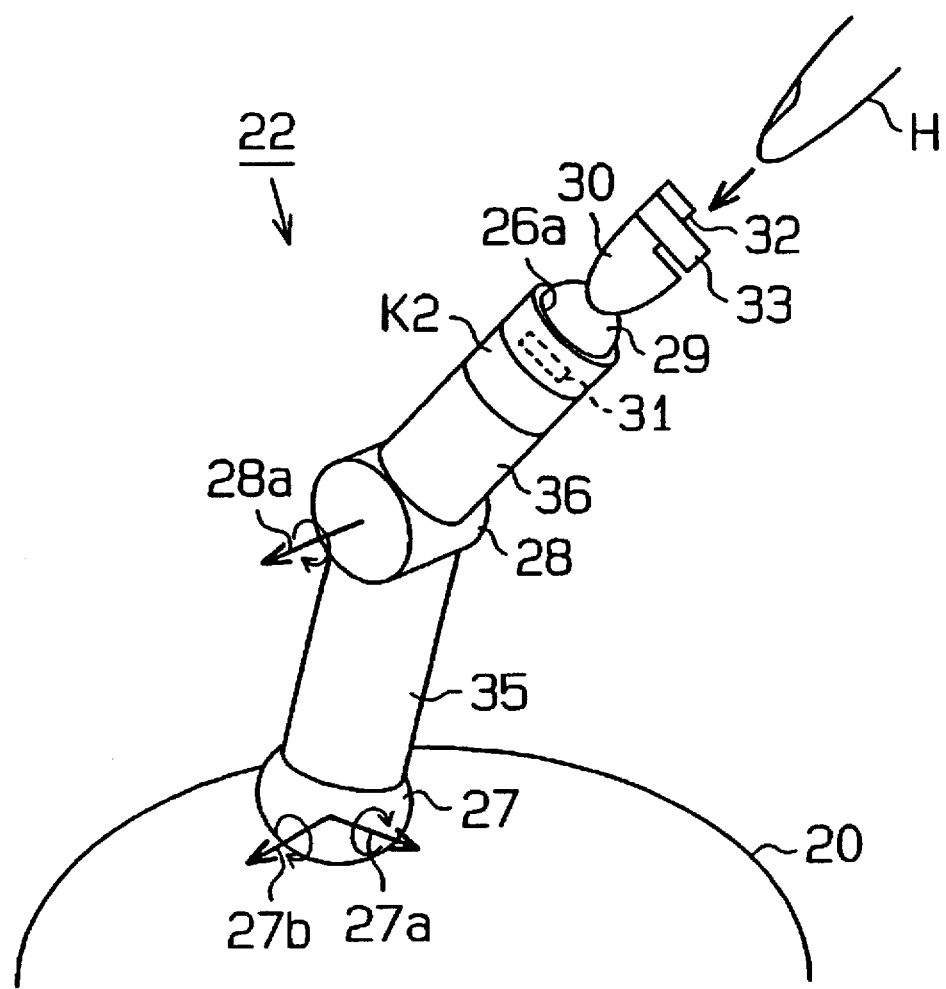
FIG. 2 is a perspective view showing a touch sense finger of the multiple finger touch sense interface of FIG. 1.

FIG. 2 shows the second touch sense finger 22 in detail. The first to fifth touch sense fingers 21–25 basically have the same function. Thus, the structure of only the second touch sense finger 22 will be discussed below.

The second touch sense finger 22 has a first link 35, a second link 36, a first finger joint 27, a second finger joint 28, a passive ball joint 29, and a finger mount or thimble 30. The first link 35 is connected to the touch sense finger base 20 by the first finger joint 27. The first finger joint 27 and the second finger joint 28 function as active finger joints.

The first finger joint 27 has two axes 27a, 27b. The first finger joint 27 permits the first link 35 to rotate about a first axis 27a and a second axis 27b, which is orthogonal to the first axis 27a.

Accordingly, the first link 35 rotates about the first axis 27a of the first finger joint 27 toward and away from the adjacent touch sense finger. Further, the first link 35 rotates in forward and rearward directions about the second axis 27b. The forward rotation refers to the gripping direction of the first link 35, and the rearward rotation refers to the opposite direction.

The second link 36 is connected to first link 35 by the second finger joint 28, which has one degree of freedom in the forward and rearward directions. That is, the second finger joint 28 permits the second link 36 to rotate about a third axis 28a, which is the axis of the second finger joint 28.

The first finger joint 27 and the second finger joint 28 each have drive motors (not shown), the number of which corresponds to the corresponding degrees of freedom. The drive motors are controlled to produce rotation about the associated first, second, third axes 27a, 27b, 28a.

The rotational angle of motor shafts of the drive motors of the first finger joint 27 and the second finger joint 28 are detected by rotary encoders URE1–URE3, respectively.

The passive ball joint 29 is spherical and received in a semispherical socket 26a. The passive ball joint 29 is freely attached to and detached from the socket 26a and rotatable within a range of 360 degrees in the socket 26a. Further, the passive ball joint 29 is made of a ferromagnet, such as steel. A permanent magnet 31 is arranged in the second link 36 near the socket 26a. The permanent magnet 31 serves as a magnetic force generation unit. The magnetic force (attractive force) of the permanent magnet 31 constantly acts to hold the passive ball joint 29 in the socket 26a. However, the passive ball joint 29 is removed from the socket 26a when a pulling force exceeding the magnetic force is applied to the passive ball joint 29.

The finger mount 30, which serves as a finger engaging portion, is fixed integrally with the top portion of the passive ball joint 29. A finger holder 32 is formed in the finger mount 30 to receive a person's finger. The finger holder 32 has a basal portion, which is located near the top portion of the passive ball joint 29. Thus, when the finger is inserted in the finger holder 32, the fingertip is located near the top portion of the passive ball joint 29. The finger holder 32 also has a distal portion, which is cut in a semispherical manner and which comes into contact with part of the finger. A ring-like fastening band 33 is secured to the peripheral surface of the finger mount 30 at the distal portion of the finger holder 32.

The fastening band 33 is made of an elastic material, such as synthetic rubber. A gap, in which the index finger is inserted, is provided between the fastening band 33 and the finger holder 32. The fastening band 33 functions to securely hold the inserted index finger in the finger holder 32.

Although not shown in the drawings, the first touch sense finger 21 and the third to fifth touch sense fingers 23–25 each have the finger holder 32 and the fastening band 33, which are connected to the thumb, the middle finger, the ring finger or the little finger, respectively.

A three-axes force sensor K2 is arranged on the distal portion of the second link 36. The three-axes force sensor K2 detects the force (translation force) applied to the second touch sense finger 22 in three axial directions, which are orthogonal to one another and generates a force detection signal.

In FIG. 3, K1–K5 denotes the three-axes sensors of the first to fifth touch sense fingers 21–25.

As shown in FIG. 1, a three-dimensional position/posture sensor 42 is attached to the wrist R of an operator H, who operates the multiple finger touch sense interface 10. The sensor 42 communicates with a three-dimensional position/posture computer 41 (FIG. 3) by means of wireless communication. The three-dimensional position/posture sensor 42 detects the position (three-dimensional position) and posture of the hand Ha of the operator H and transmits the detection signal to the three-dimensional position/posture computer 41.

The position of the hand Ha is represented by three parameters based on the coordinate system of the hand Ha (hereafter referred to as a hand coordinate system (xh, yh, zh)), which origin position is Oh. The posture of the hand Ha is represented by three parameters indicating rotational angles about axes xh, yh, and zh. Thus, the posture of the hand Ha corresponds to the posture of the hand in the hand coordinate system.

The three-dimension position/posture computer 41 receives the detection signal sent from the three-dimension position/posture sensor 42. Then, the three-dimensional position/posture computer 41 generates a position data and posture data signal, which is based on the hand coordinate system, in relation with the position and posture of the hand Ha. The position data signal and the posture data signal are provided to a controller 40.

The controller 40 includes a central processing unit (CPU) 40a, a ROM 40b, and a RAM 40c. The ROM 40b stores various control programs, such as a program for controlling the multiple finger touch sense interface 10. The RAM 40c functions as an operation memory when the CPU 40a performs calculations.

A second touch sense finger drive device 45 is electrically connected to the controller 40. The second touch sense finger drive device 45 drives the first finger joint 27, which has the first and second axes 27a, 27b, and the second finger joint 28, which has the third axis 28a, in accordance with a second touch sense control signal from the controller 40.

Drive devices of the first touch sense finger 21 and the third to fifth touch sense fingers 23–25 drive the corresponding first and second finger joints 27, 28 in accordance with associated first and third to fifth touch sense control signals, which are provided from the controller 40. FIG. 3 shows only the second touch sense finger drive device 45 of the second touch sense finger 22 and the first and second finger joints 27, 28. The drive devices and first and second finger joints of the other touch sense fingers are not shown.

An arm drive device 46 is electrically connected to the controller 40. The arm drive device 46 drives the first arm joint 16, the second arm joint 17, and the wrist joint 18 in accordance with an arm control signal from the controller 40.

A robot controller 100 remotely controls a robot, which has a humanoid hand (hereafter referred to as robot hand), with the multiple finger touch sense interface 10. The robot controller 100 communicates with the controller 40 by means of wire or wireless communication. Like a human hand, the robot hand has five fingers and an arm. The robot controller 100 drives the robot hand in accordance with an instruction data signal, which is provided from a multiple finger touch sense interface 10.

Figure 4:
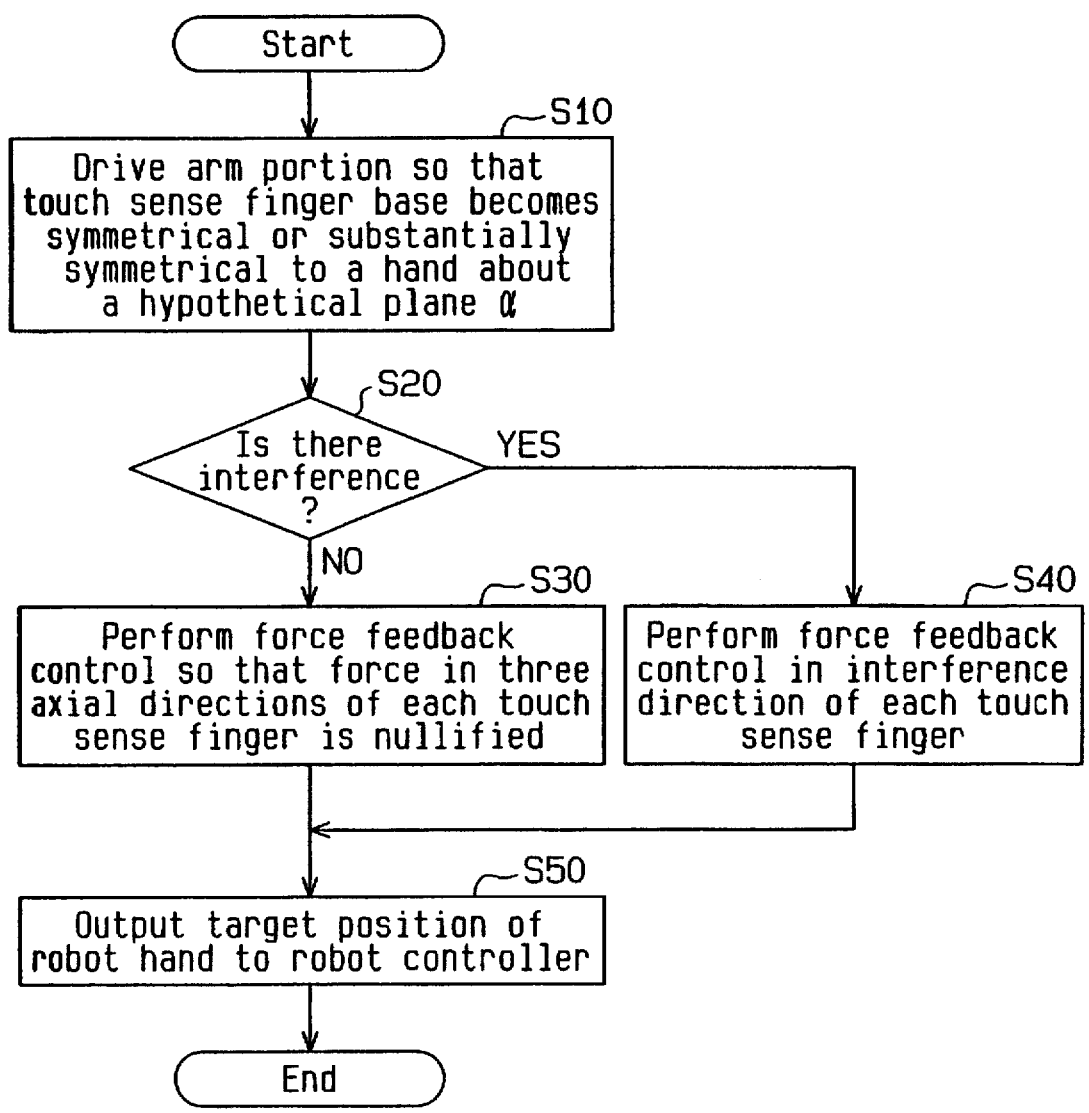
FIG. 4 is a flowchart illustrating the control of the multiple finger touch sense interface of FIG. 1.

The operation of the multiple finger touch sense interface 10 will now be discussed with reference to the flowchart of FIG. 4. The flowchart represents an instruction control program, which is executed by the CPU 40a of the controller 40 in a cyclic manner.

The control program controls the operation of the robot in virtual space. Based on a demonstration performed by an operator H, the control program instructs the robot, which is in the virtual space, of the position and force of the robot hand. When the control program is being executed, the fastening bands 33 of the first to fifth touch sense fingers 21–25 hold the five fingers of the operator H in the finger holder 32 of the corresponding mounts 30. When the operator H moves his or her hand, force is applied to each of the touch sense fingers 21–25. The force is detected and the force detection signal is generated by the corresponding three-axes sensors K1–K5.

The three-dimensional position/posture sensor 42 detects the position and posture of the hand Ha of the operator H and transmits a detection signal to the three-dimensional position/posture computer 41. The three-dimensional position/posture computer 41 generates a position data signal and a posture data signal of the hand coordinate system from the detection signal. The three-dimensional position/posture computer 41 then sends the signals to the controller 40.

The rotary encoders ARE1–ARE7 of the arm mechanism and the rotary encoders URE1–URE3 of the touch sense fingers 21–25 detect the rotational angles about the associated axes, in the joints.

[Step S10]

In step S10, when the execution of the instruction control program starts, the CPU 40a of the controller 40 drives the arm portion 12 and each touch sense finger so that the operator H can freely move his or her hand Ha.

The CPU 40a first drives the arm portion 12 so that the position and posture of the touch sense finger base 20 is opposed to the position and posture of the hand Ha of the operator H. Simultaneously, the CPU 40a provides the arm drive device 46 with an arm control signal that drives the arm portion 12 so that the touch sense finger base 20 becomes symmetrical or substantially symmetrical to the hand Ha of the operator about the hypothetical plane α, which is formed by at least three of the fingertips of the operator H.

More specifically, the CPU 40a receives the position data and posture data signal in the hand coordinate signal (xh, yh, zh) in relation with the position and posture of the hand H of the operator H from the three-dimensional position/posture computer 41. The CPU 40a then converts the position data and posture data signal to a position data signal and a posture data signal in the touch sense finger base coordinate system (xm, ym, zm) based on the referential coordinate system (xo, yo, zo).

The CPU 40a provides the arm control signal to the arm drive device 46 to drive the arm portion 12 so that position and posture of the touch sense finger base 20 in the touch sense finger base coordinate system opposes the position and posture of the hand Ha (i.e., so that the touch sense finger base 20 is arranged symmetric to the hand Ha about the hypothetical plane α, which is defined by at least three of the fingertips of the operator H).

The arm mechanism, which includes the arm portion 12, the first arm joint 16, the second arm joint 17, and the wrist joint 18, has seven degrees of freedom. Thus, the arm mechanism easily arranges the touch sense finger base 20 and the hand Ha in an opposed manner within the movable range of the arm mechanism.

The hypothetical plane α will now be discussed.

The hypothetical plane α is based on a plane formed by the fingertips of three fingers, which are the thumb, the index finger, and the middle finger. When the three fingers are arranged in a substantially linear manner, the plane is determined using the fingertips of the other fingers with the least square method.

The fingertips of the hand Ha are held in the finger holders 32 of the finger mounts 30 in the first to fifth touch sense fingers 21–25. Accordingly, the position of the fingertips of the hand Ha is the same as the position of the distal ends of the touch sense fingers 21–25 (i.e., the position of the finger holders 32). Thus, the CPU 40a determines the hypothetical plane α based on the positions of the distal ends of at least three of the touch sense fingers (three-dimensional positions). Then, based on the positions of the distal ends of the touch sense fingers, the CPU 40a calculates the angle and length of each touch sense finger and the angle and length of the arm mechanism.

The angle of each touch sense finger and the angle of the arm mechanism are respectively calculated from the detection values of the rotary encoders URE1–URE3 of the touch sense fingers and from the detection values of the rotary encoders ARE1–ARE7 of the arm mechanism. The length of each touch sense finger and the length of the arm mechanism, which correspond to the length of each member that forms the touch sense finger and the arm mechanism, are stored beforehand in the ROM 40b.

[Step S20]

In step S20, the CPU 40a determines whether or not there is interference between the robot hand and a virtual object in the virtual space. When the robot hand is in contact with the virtual object, the robot controller 100 sends an interference signal to the controller 40. When there is no contact between the robot hand and the virtual object, the robot controller 100 does not provide the controller 40 with the interference signal. The interference signal indicates the level of the interference force applied to each finger of the robot hand and indicates the interference direction of each finger.

In step S20, when the robot hand is not interfering with the virtual object in the virtual space and the CPU 40a is not provided with the interference signal, the CPU 40a proceeds to step S30. On the other hand, in step S20, when determining that the robot hand is interfering with the virtual object in the virtual space, the CPU 40a proceeds to step S40.

[Step S30]

In step S30, the CPU 40a performs force feedback control on each touch sense finger so the force applied to the fingertip of each touch sense finger in three axial directions (the directions detected by the three-axes force sensors K1–K5) is nullified. That is, the drive motors associated with the first and second axes 27a, 27b of the first finger joint 27 and the drive motor associated with the third axis 28a in each touch sense finger are feedback controlled so that the detection values of the three-axes force sensors K1–K5 each become null.

During the force feedback control, the CPU 40a calculates the present position (three-dimensional position) of the distal end of each touch sense finger from the angle and length of the touch sense fingers and the angle and length of the arm mechanism.

The calculated distal end position of each touch sense finger (i.e., the position of the finger holder 32 (three-dimensional position)) is set as the target position in the virtual space that is to be instructed to the robot hand.

(Step S40)

When there is interference between the robot hand and the virtual object, step S40 is processed to transmit the interference force produced between the robot hand and the virtual object to each touch sense finger. To transmit the perception of force, or interference force, to the operator H in accordance with the interference direction data of each finger, which is included in the interference signal from the robot controller 100, the CPU 40a performs force feedback control on each of the touch sense fingers 21–25 in each interference direction.

To enable each touch sense finger to move freely in a plane extending along a direction orthogonal to the interference direction, the CPU 40a feedback controls each touch sense finger so that the force in the orthogonal direction at the fingertips of the operator H is nullified. Then, the CPU 40a proceeds to step S50.

The CPU 40a also calculates the present position (three-dimensional position) of the distal end of each touch sense finger from the angle and length of the touch sense fingers and the angle and length of the arm mechanism during the feedback control of step S40.

The calculated distal end position of each touch sense finger (i.e., the position of the finger holder 32 (three-dimensional position)) is set as the target position in the virtual space that is to be instructed to the robot hand.

In step S30, the robot hand does not interfere with the virtual object. Thus, the CPU 40a does not generate the instruction data related to force in the virtual space. After processing step S30, the CPU 40a proceeds to step S50.

Further, in the feedback control, the force in the interference direction detected by each of the three-axes force sensors K1–K5 of the touch sense fingers is set as the instruction data related to force that should be instructed to the robot hand.

(Step S50)

In step S50, the CPU 40a provides the robot controller with the data of the target position of the robot hand calculated in step S30 or S40 or the instruction data of the force that is to be instructed to the robot hand. The CPU 40a then ends the program.

Accordingly, when there is no interference between the robot hand and the virtual object, the CPU 40a controls the touch sense finger 22 and the associated arm portion 12 so that the operator H can move his or her hand Ha freely. When there is interference between the robot hand and the virtual object, the interference force is transmitted to the operator's multiple fingers.

The operation of the passive ball joint 29 will now be discussed.

The fingertips of the operator H are held in the finger holder 32 of the finger mount 30 in each touch sense finger. In this state, the passive ball joint 29 enables the posture of a fingertip to be changed at the same position. This smoothens the connection between each touch sense finger and the operator H and mechanically absorbs differences between the size of each touch sense finger and the size of the arm and hand Ha of the operator.

In each touch sense finger, the passive ball joint 29 is attracted to the permanent magnet 31 and held in the socket 26a. Thus, when an excessive pulling force is applied from the fingertip of the operator H, the passive ball joint 29 automatically falls out of the touch sense finger. Accordingly, due to the pulling force applied at the fingertips of the operator H, sudden posture changes of the operator H are prevented.

The multiple finger touch sense interface 10 of the first embodiment has the advantages described below.

(1) The multiple finger touch sense interface 10 has an arm mechanism including the arm portion 12, the first arm joint 16, the second arm joint 17, and the wrist joint 18 (active arm joint). Further, the multiple finger touch sense interface 10 includes the touch sense finger base 20, the finger mounts 30 (fingertip engaging portion), which engage the fingertips of the operator, and the touch sense fingers. Each touch sense finger has the first finger joint 27, which moves in cooperation of the movement of the corresponding fingertip, and the second finger joint 28 (active finger joint).

The three-dimensional position/posture sensor 42 detects the position and posture of the hand Ha of the operator H. Based on the detected position and posture of the hand Ha, the CPU 40a drives the first arm joint 16, the second arm joint 17, and the wrist joint 18 so that the touch sense finger base 20 opposes the hand Ha of the operator H.

The CPU 40a further drives the first finger joint 27 and the second finger joint 28 in accordance with the detection signal indicating the movement of the fingertips of the operator H that are detected by the three-axes force sensors K1–K5. As a result, the multiple finger touch sense interface 10 has a wide operating space, which is the operating area of the arm mechanism, and transmits force perceptions to the fingertips.

Further, the operator H does not feel the weight of the multiple finger touch sense interface 10. Further, it is not burdensome for the operator H to connect his or her hand Ha to the multiple finger touch sense interface 10.

The multiple finger touch sense interface 10 is not attached to the operator's hand. Thus, the operator does not feel awkward.

(2) The CPU 40a performs feedback control based on the detection results of the three-axes force sensors K1–K5, which is provided for each touch sense finger, to control the force applied to the fingertips of the operator. As a result, interference forces are selectively applied to the fingertips of the operator H.

(3) The CPU 40a performs feedback control so that the force applied to the fingertips of the operator H is nullified. As a result, the freedom of the hand Ha of the operator H is not constrained when there is no interference between the robot hand and the virtual object.

(4) The first arm joint 16, the second arm joint 17, and the wrist joint 18 enable the arm portion 12 to have seven degrees of freedom. Thus, the arm portion 12 is driven in a relatively simple manner so that the position and posture of the touch sense finger base 20 opposes the position and posture of the hand Ha (i.e., so that the touch sense finger base 20 is arranged symmetric to the hand Ha about the hypothetical plane α, which is defined by at least three of the fingertips of the operator H).

(5) Due to the first finger joint 27 and the second finger joint 28 (active finger joint), each touch sense finger has three degrees of freedom. Thus, the multiple finger touch sense interface 10, which is provided with the touch sense fingers that have three degrees of freedom, has the above advantages (1) to (4).

(6) The finger mounts 30 (fingertip engaging portions) are located at the distal end of the touch sense fingers. Accordingly, the operator's fingertips engage the finger mounts 30 without any obstacles. If the finger mounts 30 were to be located at the basal end of the touch sense fingers, there may be interference between the operator's fingers and the distal portion of the touch sense finger.

(7) Each finger mount 30 includes the passive ball joint 29, which rolls freely in the distal end of the touch sense finger, and the finger holder 32, which is arranged on the passive ball joint 29. Accordingly, the passive ball joint 29 enables the posture of the corresponding fingertip to be changed without changing the fingertip position. As a result, the touch sense fingers are smoothly connected to the operator H. Further, the difference between the size of the touch sense finger interface and the size of the operator's arm or hand Ha is mechanically absorbed.

(8) The finger mount 30 includes the permanent magnet 31 (attraction unit), which attracts and holds the passive ball joint 29. Due to the permanent magnet 31, when the operator H applies an excessive pulling force to the fingertips, the passive ball joints 29 automatically fall out of the touch sense finger. Thus, the excessive pulling force is not continuously applied to the fingertips of the operator H.

(9) Each permanent magnet 31 generates a magnetic force that attracts and holds the associated passive ball joint 29. Accordingly, the above advantage (8) is obtained by attracting and holding the passive ball joint 29 with the magnetic force.

(10) The first arm joint 16, the second arm joint 17, and the wrist joint 18 (active arm joint) are driven so that the touch sense finger base 20 is arranged symmetric to the hand Ha of the operator H about the hypothetical plane α, which is defined by at least three of the fingertips of the operator, based on the detection result of the position and posture of the hand Ha of the operator H. As a result, the touch sense finger base 20 is opposed to the hand Ha in an optimal manner.

(11) The multiple finger touch sense interface 10 includes the three-dimensional position/posture sensor 42, which detects the position and posture of the hand Ha of the operator H. Accordingly, the above advantage (10) is obtained based on the detection result of the three-dimensional position/posture sensor 42.

(12) The multiple finger touch sense interface 10 includes the three-axes force sensors K1–K5, which detect the movements of the fingertips of the operator H. The CPU 40a drives the first and second finger joints 27, 28 in accordance with the movement of the fingertips detected by the three-axes force sensors K1–K5. Accordingly, the above advantage (10) is obtained from the detection results of the three-axes force sensors K1–K5.

Figure 5:
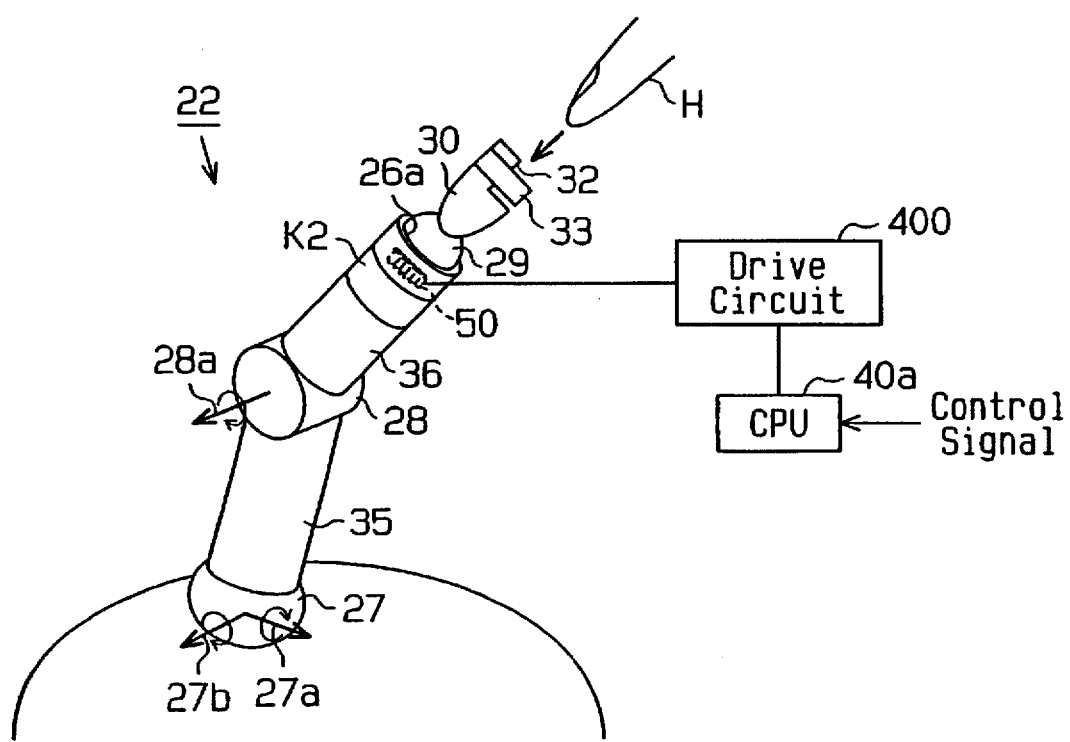
FIG. 5 is a perspective view showing a touch sense finger of a multiple finger touch sense interface according to a second embodiment of the present invention.

Referring to FIG. 5, a multiple finger touch sense interface according to a second embodiment of the present invention uses an electromagnet 50 as the magnetic force generation unit in lieu of the permanent magnet 31. The electromagnet 50 is connected to a drive circuit 400, which supplies a coil of the electromagnet with exciting current. The CPU 40a controls the drive circuit 400 in accordance with a magnetic force control signal, which is provided from an external device (not shown), to adjust the magnetic force of the electromagnet. The adjustment of the magnetic force varies the force attracting and holding the passive ball joint 29 in the finger mount 30.

In the second embodiment, the maximum pulling force that may be applied at the fingertips of the operator H is adjusted in accordance with whether the operator H is a male or a female or in accordance with the age of the operator H.

Figure 6:
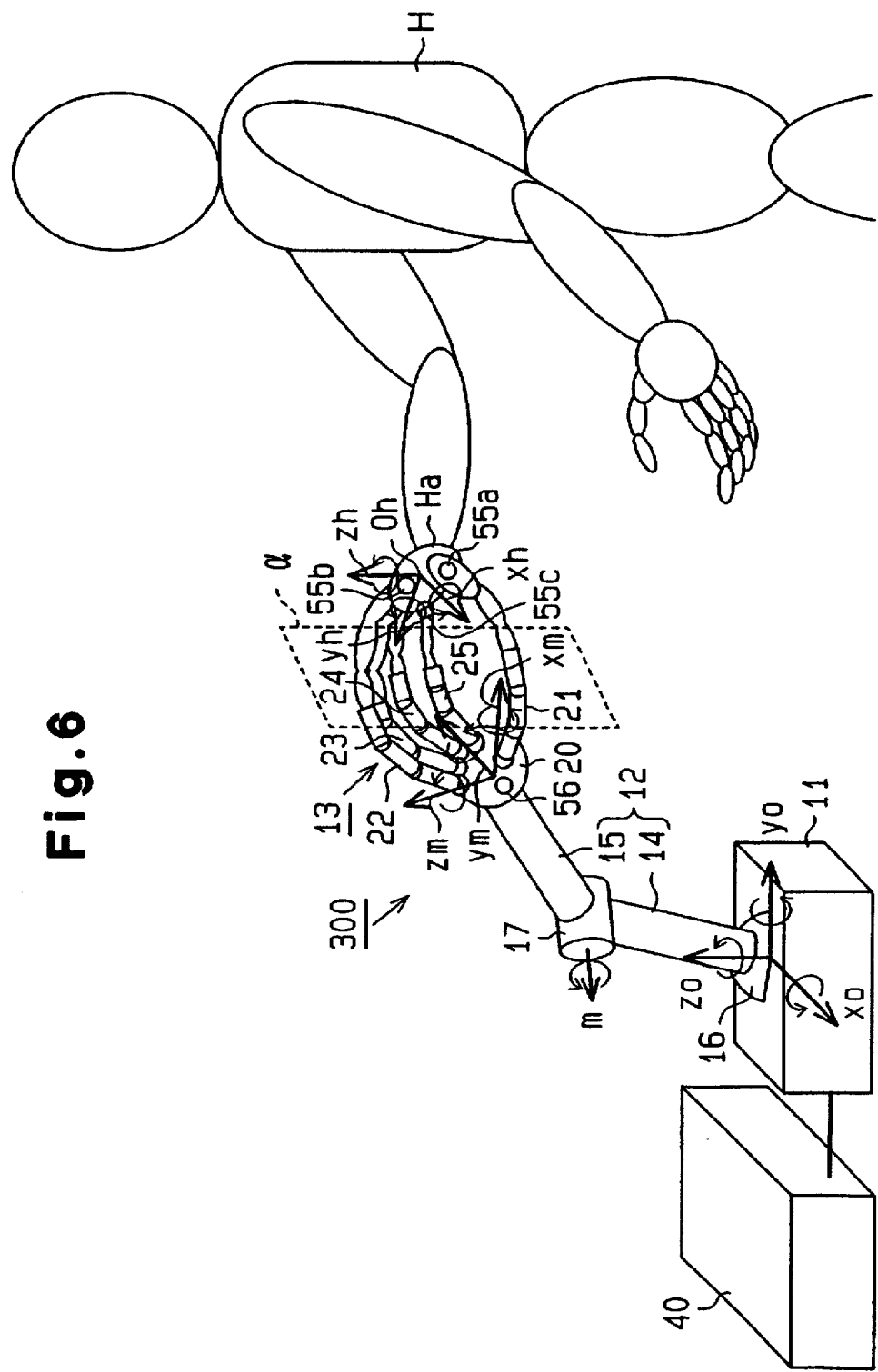
FIG. 6 is a schematic view of a multiple finger touch sense interface according to a third embodiment of the present invention.

Referring to FIG. 6, in a multiple finger touch sense interface 300 according to a third embodiment of the present invention, the three-dimensional position/posture computer 41 and the three-dimensional position/posture sensor 42 are eliminated. Transmitters 55a–55c of three ultrasonic wave distance sensors are attached to each predetermined portion (target) on the hand Ha of the operator H. The position coordinates relative to the hand coordinate system of the transmitters 55a–55c are stored beforehand in the ROM 40b.

An ultrasonic wave distance sensor receiver 56 is arranged in the touch sense finger base 20. The coordinate position of the receiver 56 relative to the touch sense finger base coordinate system is stored beforehand in the ROM 40b. The receiver 56 receives ultrasonic waves that are transmitted from the transmitters 55a–55c and measures the distance between the touch sense finger base 20 and each target (the predetermined portions of the hand Ha).

The CPU 40a calculates the position and posture of the hand Ha of the operator H based on the three distance measurement values and the coordinate positions of the transmitters 55a–55c and the receiver 56. The CPU 40a drives the arm portion 12 and the touch sense fingers based on the calculated portion data and posture data of the hand Ha.

In the third embodiment, the receiver 56 and the CPU 40a obtain the distance measurement values of the transmitters 55a–55c of the hand Ha. The ultrasonic wave distance sensor used to obtain the distance measurement values is less expensive than the three-dimensional position/posture computer 41 and the three-dimensional position/posture sensor 42. Thus, the multiple finger touch sense interface 300 is simple and less expensive.

It should be apparent to those skilled in the art that the present invention may be embodied in many other specific forms without departing from the spirit or scope of the invention. Particularly, it should be understood that the present invention may be embodied in the following forms.

(1) The arm mechanism may be configured so that has six degrees of freedom or eight or more degrees of freedom instead of having seven degrees of freedom. The arm mechanism may be configured so that it has six degrees of freedom as long as there are three parameters that indicate the origin of three orthogonal axes and three parameters that indicate the rotational angle about the axes in a coordinate system.

(2) In the third embodiment, one transmitter and three receives may be employed. The transmitters 55a–55c may be arranged in the touch sense finger base 20, and the receiver 56 may be arranged in the hand Ha.

(3) The first to fifth touch sense fingers 21–25 may have three or more degrees of freedom.

(4) The passive ball joint 29 may be held by means of vacuum adsorption. In this case, one or more suction holes are provided in the socket 26a, and air is drawn through the suction hole by a vacuum pump.

(5) In the second embodiment, the magnetic force of the electromagnet 50 does not have to be adjusted, and the electromagnet 50 may be supplied with constant exciting current.

The present examples and embodiments are to be considered as illustrative and not restrictive, and the invention is not to be limited to the details given herein, but may be modified within the scope and equivalence of the appended claims.

What is claimed is:

1. A touch sense interface comprising:
   an arm mechanism including an active arm joint;
   a touch sense finger base arranged in the arm mechanism;
   a plurality of touch sense fingers arranged on the touch sense finger base, wherein the touch sense fingers each includes an active finger joint and a fingertip engaging portion, which engages a fingertip of a corresponding finger of an operator;
   a first detection unit for detecting the position and posture of a hand of the operator to generate a position and posture detection signal;
   a control unit electrically connected to the first detection unit, wherein the control unit controls the active arm joint in accordance with the position and posture detection signal and arranges the touch sense finger base so that it is opposed to and spaced by the touch sense fingers from the hand of the operator; and
   a second detection unit electrically connected to the control unit to detect the movement of each fingertip and generate a movement detection signal, wherein the control unit controls the active finger joint in accordance with the movement detection signal.

2. The touch sense interface according to claim 1, wherein the second detection unit includes a plurality of force sensors, each arranged in correspondence with one of the touch sense fingers to detect forces acting in multiple axial directions and generate a corresponding force detection signal, which serves as the movement detection signal, and wherein the control unit force feedback controls each active finger joint in accordance with the corresponding force detection signal to control the force applied to the fingertips of the operator.

3. The touch sense interface according to claim 2, wherein the control unit performs the force feedback control based on the force detection signal so that the force applied to the fingertips of the operator is nullified.

4. The touch sense interface according to claim 1, wherein the arm mechanism has six or more degrees of freedom.

5. The touch sense interface according to claim 1, wherein each touch sense finger has three or more degrees of freedom.

6. The touch sense interface according to claim 1, wherein the fingertip engaging portion is located at a distal end of each touch sense finger.

7. The touch sense interface according to claim 6, wherein the fingertip engaging portion includes a passive ball joint, which rolls freely at the distal end of each touch sense finger, and a finger holder, which is connected to the passive ball joint and engages the corresponding fingertip of the operator.

8. The touch sense interface according to claim 7, wherein each touch sense finger includes an attraction unit for attracting the passive ball joint.

9. The touch sense interface according to claim 8, wherein the attraction unit is a magnetic force generation unit for attracting the passive ball joint with magnetic force.

10. The touch sense interface according to claim 9, wherein the magnetic force generation unit is an electromagnet, and the interface further comprises a magnetic force control unit for adjusting the magnetic force of the electromagnet in accordance with the control signal.

11. The touch sense interface according to claim 1, wherein the first detection unit includes a sensor arranged in the touch sense finger base to detect a position and posture of hand of the operator and generate a position and posture detection signal.

12. The touch sense interface according to claim 1, wherein the position of the hand of the operator is represented by an origin position of a coordinate system formed by three orthogonal axes, and the posture of the hand is represented by three rotational angles about the three axes.

13. A touch sense interface comprising:
an arm mechanism including a plurality of active arm joints and an arm connected between the active arm joints;
a touch sense finger base connected to one of the active arm joints;
a plurality of touch sense fingers arranged on the touch sense finger base, wherein the touch sense fingers each have a plurality of active finger joints, including a first active finger joint, that are connected to the touch sense finger base;
a plurality of links connected between the active finger joints;
a fingertip engaging portion arranged on a distal end of one of the links to engage a fingertip of a corresponding finger of an operator;
a first detection unit for detecting the position and posture of a hand of the operator to generate a position and posture detection signal;
a control unit electrically connected to the first detection unit, wherein the control unit controls the active arm joint in accordance with the position and posture detection signal and arranges the touch sense finger base opposed to the hand of the operator and spaced from the hand of the operator by the touch sense fingers; and
a second detection unit electrically connected to the control unit to detect the movement of each fingertip and generate a movement detection signal, wherein the control unit controls the active finger joints of each touch sense finger in accordance with the movement detection signal.

14. The touch sense interface according to claim 13, wherein the control unit controls the active arm joints so that the touch sense finger base is arranged symmetric to or substantially symmetric to the hand of the operator about a hypothetical plane, which is formed by at least three of the fingertips of the operator in accordance with the position and posture detection signal.

15. The touch sense interface according to claim 13, wherein the second detection unit includes a plurality of force sensors, each arranged in correspondence with one of the touch sense fingers to detect forces acting in multiple axial directions and generate a force detection signal, which serves as the movement detection signal, and wherein the control unit force feedback controls the active finger joints in accordance with the force detection signal to control the force applied to the fingertips of the operator.

16. The touch sense interface according to claim 15, wherein the control unit performs the force feedback control based on the force detection signal so that the force applied to the fingertips of the operator is nullified.

17. A method for controlling a touch sense interface including an arm mechanism having an active arm joint, a touch sense finger base arranged in the arm mechanism, and a plurality of touch sense fingers arranged on the touch sense finger base, wherein the touch sense fingers each have a fingertip engaging portion, which engages a fingertip of a corresponding finger of an operator, and an active finger joint, the method comprising the steps of:
detecting a position and posture of a hand of the operator; and
controlling the active arm joint so that the touch sense finger base is arranged symmetric to or substantially symmetric to the hand of the operator and spaced by the touch sense fingers from the hand about a hypothetical plane, which is formed by at least three of the fingertips of the operator in accordance with the position and posture detection signal.

18. The method according to claim 17, wherein the detecting step includes detecting the position and posture of the operator with a sensor.

19. The method according to claim 17, wherein the sensor is arranged on the hand of the operator to detect the position and posture of the hand.

20. The method according to claim 17, further comprising the steps of:
detecting movement of each fingertip of the operator; and
controlling the active finger joint in accordance with the detected fingertip movement.

21. The method according to claim 17, wherein the active arm joint is positionable in three axes, and where said controlling step includes controlling the active arm joint in the three axes.

* * * * *